United States Patent
Fukuda et al.

(10) Patent No.: US 9,121,364 B2
(45) Date of Patent: Sep. 1, 2015

(54) CONTROL APPARATUS FOR INTERNAL COMBUSTION ENGINE

(75) Inventors: Atsushi Fukuda, Susono (JP); Tomohiro Shinagawa, Sunto-gun (JP); Yuuichi Kato, Susono (JP); Takashi Kawai, Susono (JP); Fumio Takamiya, Gotenba (JP); Takahiro Uchida, Okazaki (JP); Masahiro Inoue, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 79 days.

(21) Appl. No.: 13/640,823

(22) PCT Filed: May 13, 2011

(86) PCT No.: PCT/JP2011/061055
§ 371 (c)(1),
(2), (4) Date: Oct. 12, 2012

(87) PCT Pub. No.: WO2012/157043
PCT Pub. Date: Nov. 22, 2012

(65) Prior Publication Data
US 2014/0053813 A1 Feb. 27, 2014

(51) Int. Cl.
*B60T 7/12* (2006.01)
*G05D 1/00* (2006.01)
*G06F 7/00* (2006.01)
*G06F 17/00* (2006.01)
(Continued)

(52) U.S. Cl.
CPC .............. *F02D 41/30* (2013.01); *F02D 41/401* (2013.01); *F02D 41/08* (2013.01); *F02D 2041/001* (2013.01); *F02D 2041/223* (2013.01); *F02D 2041/389* (2013.01); *F02D 2200/0602* (2013.01); *Y02T 10/44* (2013.01)

(58) Field of Classification Search
CPC ..... Y02T 10/44; Y02T 10/123; F02D 19/061; F02D 2041/389
USPC ......... 123/294, 434, 445, 472, 478, 479, 480; 701/101, 102, 103, 104, 107
See application file for complete search history.

(56) References Cited

U.S. PATENT DOCUMENTS

| | | | |
|---|---|---|---|
| 6,460,514 B1 | 10/2002 | Imai et al. | |
| 8,229,650 B2* | 7/2012 | Yasui et al. | 701/104 |
| 2008/0269955 A1* | 10/2008 | Yasui et al. | 700/299 |
| 2009/0288638 A1 | 11/2009 | Dintino et al. | |
| 2013/0090837 A1* | 4/2013 | Jade et al. | 701/104 |

FOREIGN PATENT DOCUMENTS

| | | |
|---|---|---|
| CN | 1297510 A | 5/2001 |
| CN | 101586505 A | 11/2009 |

(Continued)

*Primary Examiner* — Mahmoud Gimie
*Assistant Examiner* — Sizo Vilakazi
(74) *Attorney, Agent, or Firm* — Sughrue Mion, PLLC

(57) ABSTRACT

Provided is a control apparatus for an internal combustion engine, which can adequately perform the control of a fuel injection amount even when an abnormality, a disconnection or the like of a fuel pressure sensor occurs and thereby accurate fuel pressure information is not able to be obtained.
A fuel injection valve (26) is provided which is capable of directly injecting fuel into a cylinder. If a target fuel injection amount is smaller than a minimum fuel injection amount that is minimum and is capable of injecting during one opening and closing operation of the fuel injection valve (26), the start timing of fuel injection is set within a period in which an exhaust valve is opened during an exhaust stroke.

4 Claims, 3 Drawing Sheets

(51) Int. Cl.
*F02M 51/00* (2006.01)
*F02D 41/30* (2006.01)
*F02D 41/40* (2006.01)
*F02D 41/08* (2006.01)
*F02D 41/00* (2006.01)
*F02D 41/22* (2006.01)
*F02D 41/38* (2006.01)

(56) References Cited

FOREIGN PATENT DOCUMENTS

| | | |
|---|---|---|
| JP | 10-299600 A | 11/1998 |
| JP | 2004-257338 A | 9/2004 |
| JP | 2007-2772 A | 1/2007 |
| JP | 2009-85165 A | 4/2009 |

* cited by examiner (A) Case in which EVC is present at advance side of TDC (B) Case in which EVC is present at retard side of TDC

CONTROL APPARATUS FOR INTERNAL COMBUSTION ENGINE

CROSS REFERENCE TO RELATED APPLICATIONS

This application is a National Stage of International Application No. PCT/JP2011/061055 filed on May 13, 2011, the contents of all of which are incorporated herein by reference in their entirety.

TECHNICAL FIELD

The present invention relates to a control apparatus for an internal combustion engine, and more particularly to a control apparatus for an internal combustion engine which is suitable as an apparatus controlling an internal combustion engine equipped with a fuel injection valve that is capable of directly injecting fuel into a cylinder.

BACKGROUND ART

So far, for example, Patent Document 1 discloses a control apparatus for an internal combustion engine that includes a feed pump for pumping up fuel in a fuel tank, and a high pressure pump disposed at the downstream side of the feed pump in a fuel passage. The conventional control apparatus controls operation and stop of the feed pump based on a pressure inside a high pressure fuel pipe at the downstream side of the high pressure pump (fuel pressure) if an abnormality has occurred to the fuel pressure.

Including the above described document, the applicant is aware of the following documents as a related art of the present invention.

CITATION LIST

Patent Documents

Patent Document 1: Japanese Laid-open Patent Application Publication No. Hei 10-299600
Patent Document 2: Japanese Laid-open Patent Application Publication No. 2009-85165

SUMMARY OF INVENTION

Technical Problem

If the control described by above described Patent Document 1 is used, it is considered that the fluctuation of a fuel pressure becomes large due to the operation and stop of the feed pump. Therefore, it is difficult to adequately control a fuel injection amount when an abnormality of the fuel pressure occurs. Moreover, when an abnormality, a disconnection or the like of a fuel pressure sensor occurs and thereby accurate fuel pressure information is not able to be obtained, it is also difficult to adequately control the fuel injection amount.

The present invention has been made to solve the problem as described above, and has its object to provide a control apparatus for an internal combustion engine, which can adequately perform the control of a fuel injection amount even when an abnormality, a disconnection or the like of a fuel pressure sensor occurs and thereby accurate fuel pressure information is not able to be obtained.

Solution to Problem

A first aspect of the present invention is a control apparatus for an internal combustion engine, comprising:

a fuel injection valve which is capable of directly injecting fuel into a cylinder;

target fuel amount level determination means which determines whether or not a target fuel injection amount is smaller than a minimum fuel injection amount that is minimum and is capable of injecting during one opening and closing operation of the fuel injection valve; and fuel injection timing setting means which if the target fuel injection amount is smaller than the minimum fuel injection amount, sets a start timing of fuel injection within a period in which an exhaust valve is opened during an exhaust stroke.

The second aspect of the present invention is the control apparatus for an internal combustion engine according to the first aspect of the present invention, wherein the fuel injection timing setting means sets the start timing of fuel injection in such a way that a fuel corresponding to a difference between the target fuel injection amount and the minimum fuel injection amount is injected during the period in which the exhaust valve is opened during the exhaust stroke The third aspect of the present invention is the control apparatus for an internal combustion engine according to the first or second aspect of the present invention, wherein the fuel injection timing setting means advances the start timing of fuel injection more as the difference between the target fuel injection amount and the minimum fuel injection amount is larger.

Advantageous Effects of Invention

According to the first aspect of the present invention, fuel injection into the cylinder is started during the period in which gas is exhausted toward an exhaust passage from the cylinder if the target fuel injection amount is smaller than the minimum fuel injection amount. Therefore, the amount of fuel left in the cylinder becomes easy to be continuously controlled to a target value by causing the surplus amount of fuel to be blown to the exhaust passage side. This makes it possible to adequately perform the control of the fuel injection amount even when an abnormality of a fuel pressure occurs or accurate fuel pressure information is not obtained. As a result of this, controllability of the internal combustion engine can be improved during an evacuation driving.

According to the second aspect of the present invention, the fuel of the amount obtained by subtracting the target fuel injection amount from the minimum fuel injection amount is injected into the cylinder during the period in which gas is exhausted toward the exhaust passage from the cylinder. This makes it possible to continuously control the amount of the fuel left in the cylinder to the target value accurately by causing only the surplus amount of the fuel to be blown to the exhaust passage side.

According to the third aspect of the present invention, the amount of the fuel left in the cylinder becomes easy to be continuously controlled to the target value accurately in a situation in which the target fuel injection amount is smaller than the minimum fuel injection amount, regardless of the fuel injection amount.

DESCRIPTION OF EMBODIMENT

First Embodiment

[Description of System Configuration]

Figure 1:
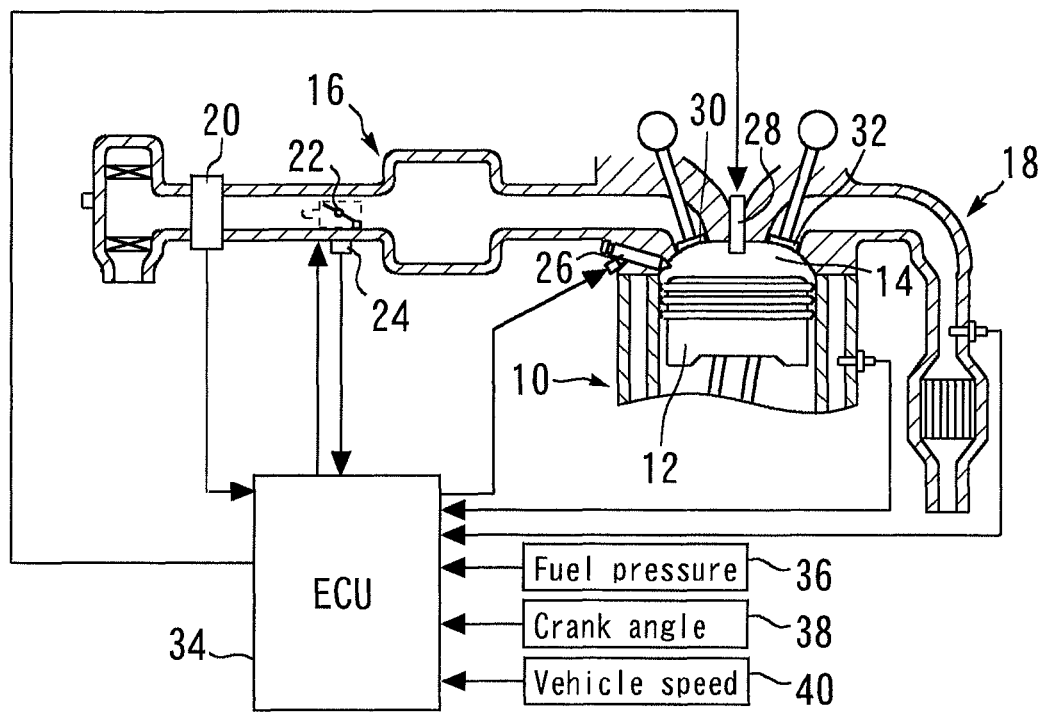
FIG. 1 is a diagram for explaining the configuration of an internal combustion engine according to a first embodiment of the present invention.

FIG. 1 is a diagram for explaining the configuration of an internal combustion engine 10 according to a first embodiment of the present invention. The system of the present embodiment includes an internal combustion engine 10. Each of cylinders of the internal combustion engine 10 contains a piston 12. Each of the cylinders of the internal combustion engine 10 also has a combustion chamber 14 formed atop the piston 12. An intake passage 16 and an exhaust passage 18 are communicated with the combustion chamber 14.

An air flow meter 20 is installed near the entrance of the intake passage 16 to output a signal representing the flow rate of the air taken into the intake passage 16. An electronically controlled throttle valve 22 is installed downstream of the air flow meter 20. A throttle angle sensor 24 for detecting a throttle angle is disposed near the throttle valve 22.

There are installed at a cylinder head of the internal combustion engine 10, a fuel injection valve 26 that is capable of injecting fuel directly into the combustion chamber 14 (into a cylinder) and an ignition plug 28 for igniting air-fuel mixture in the cylinder. Intake valves 30 and exhaust valves 32 are provided at the intake port and an exhaust port, respectively. The intake valves 30 establish continuity or discontinuity between the combustion chamber 14 and the intake passage 16, and the exhaust valves 32 establish continuity or discontinuity between the combustion chamber 14 and the exhaust passage 18.

The system shown in FIG. 1 includes an ECU (Electronic Control Unit) 34. There are connected to an input of the ECU 34, various sensors, such as a fuel pressure sensor 36 for detecting a pressure of fuel supplied to the fuel injection valve 26 (hereinafter, simply referred to as a "fuel pressure"), a crank angle sensor 38 for detecting an engine speed, and a vehicle speed sensor 40 for detecting a speed of a vehicle which is mounted with the internal combustion engine 10, as well as the air flow meter 20 and the throttle angle sensor 24 described above. In addition, there are connected to an output of the ECU 34, various actuators, such as the throttle valve 22, the fuel injection valve 26 and the ignition plug 28 described above. The ECU 34 controls the operating state of the internal combustion engine 10 by actuating each actuator based on the output of each sensor and predetermined programs.

Figure 2:
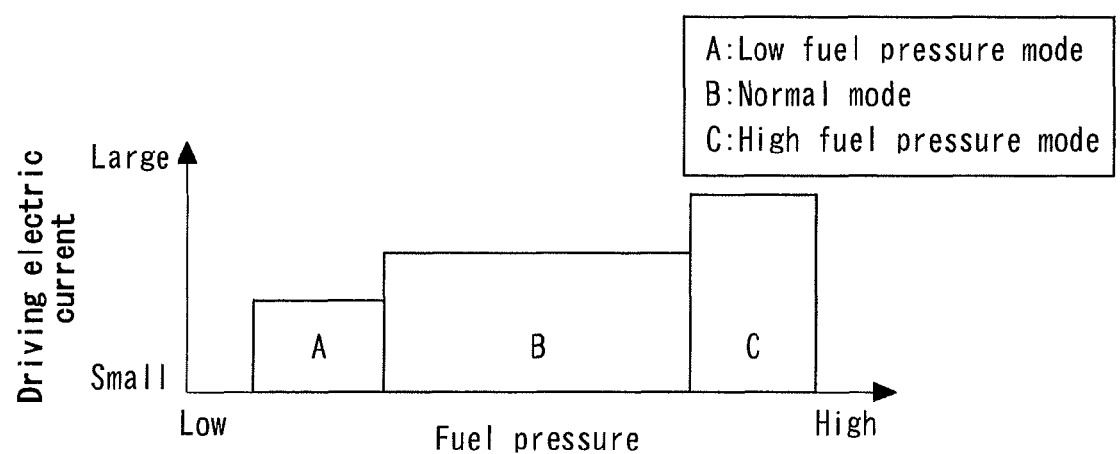
FIG. 2 is a diagram illustrating a relationship between a driving electric current of a fuel injection valve, and the fuel pressure.

FIG. 2 is a diagram illustrating a relationship between a driving electric current of the fuel injection valve 26, and the fuel pressure.

As shown in FIG. 2, the driving electric current of the fuel injection valve 26 in the system according to the present embodiment is set so as to change in accordance with the fuel pressure (load of the internal combustion engine 10). To be more specific, a "low fuel pressure mode" shown in FIG. 2 is a mode that is used during operation in which a target (required) fuel injection amount is small, for example, an idling operation or a low speed operation, and is used within a fuel pressure range at a lower pressure side with respect to a fuel pressure range during a "normal mode" which is used during normal operation. A "high fuel pressure mode" is a mode that is used during operation in which the target (required) fuel injection amount is large, for example, a high load operation, and is used within a fuel pressure range at a higher pressure side with respect to the fuel pressure range during the normal mode. The driving electric current during the low fuel pressure mode is set so as to be lower than that during the normal mode, and the driving electric current during the high fuel pressure mode is set so as to be higher than that during the normal mode.

During operation of the internal combustion engine 10, an abnormality, a disconnection or the like of the fuel pressure sensor 36 may occur and thereby accurate fuel pressure information may not be able to be obtained. If the driving electric current is set so as to be controlled low, there is a possibility that fuel injection with a desired amount may not be able to be performed during the high load operation in such a case. In the present embodiment, an arrangement is made such that a maximum electric current application mode is used as a fail safe mode in a case in which the accurate fuel pressure information comes not to be obtained. This maximum electric current application mode sets (fixes) the driving electric current using a value during the high fuel pressure mode, and the fuel pressure using a predetermined value within a high fuel pressure range targeted for the high fuel pressure mode, without relying on the operational condition of the internal combustion engine 10. This makes it possible to ensure the operation of the internal combustion engine 10 in the high load region.

If, however, the above-described maximum electric current application mode is used as the fail safe mode in situations in which the target (required) fuel injection amount are low, such as during an idling operation or a low speed running, more fuel injection amount than a predetermined base value comes to be injected owing to, for example, a highly-controlled fuel pressure. As a result of this, if accurate information on the fuel pressure is not able to be obtained, it becomes difficult to perform an evacuation driving because combustion becomes unable to be established during the idling operation or the low speed running.

[Characteristic Fuel Injection Control of the First Embodiment]

Figure 3:
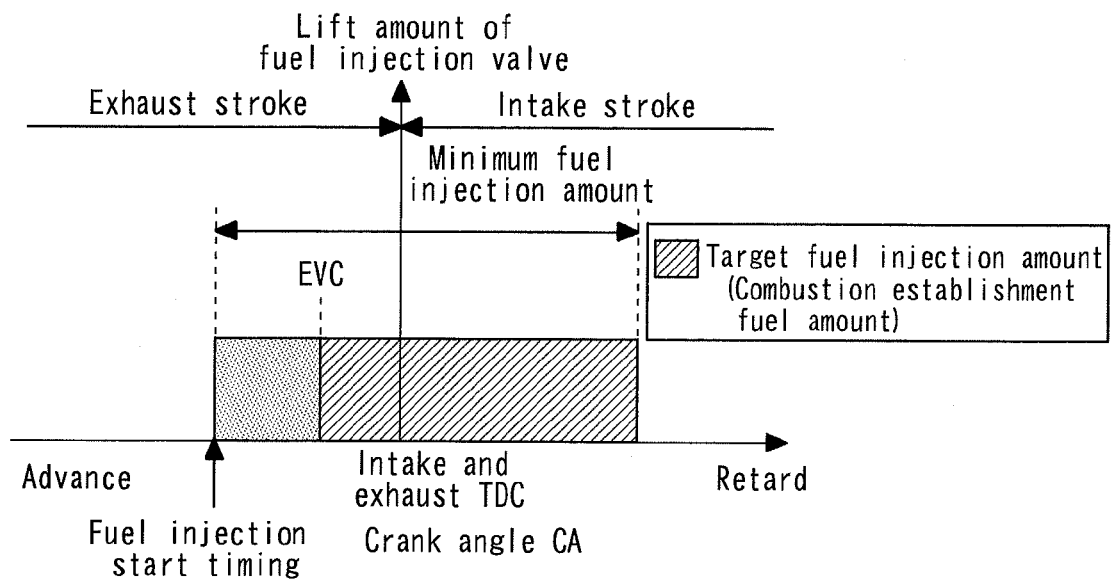
FIG. 3 is a diagram illustrating a characteristic fuel injection control according to the first embodiment of the present invention.
Figure 3:
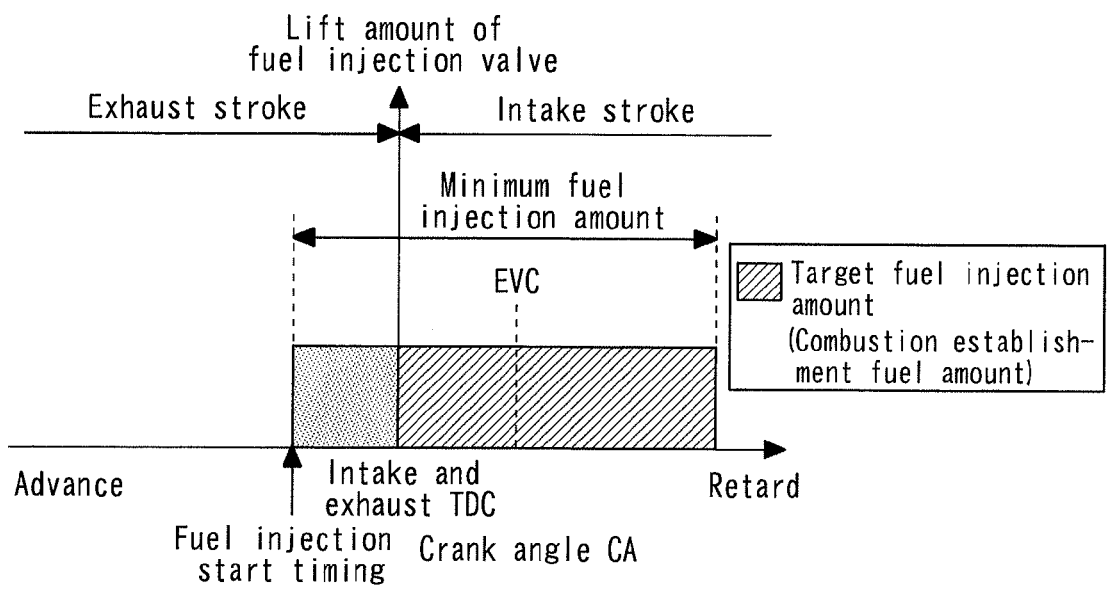

FIG. 3 is a diagram illustrating the characteristic fuel injection control according to the first embodiment of the present invention.

In an internal combustion engine including a fuel injection valve capable of directly injecting fuel into a cylinder, such as the fuel injection valve 26, fuel injection for obtaining the torque of the internal combustion engine is normally performed at the intake stroke or the compression stroke. In contrast, in the present embodiment, the following fuel injection control is performed in order to solve the above described problem. Specifically, if an idling operation or a low speed running is performed during operating the fail safe mode (maximum electric current application mode), it is determined that there occurs a situation in which the target fuel injection amount becomes smaller than a minimum fuel injection amount that the fuel injection valve 26 can inject at one time (during one opening and closing operation of the fuel injection valve 26) (hereinafter, referred to as the "minimum fuel injection amount"). Subsequently, in this case, a start timing of the fuel injection is set during a period in which the exhaust valve 32 is opened during the exhaust stroke.

Hereinafter, the present fuel injection control will be described in detail with use of two cases in FIGS. 3(A) and 3(B). It is noted that since the present fuel injection control assumes the idling operation or low speed running in which the valve overlap period is not set normally, it is herein supposed that the intake valve 30 opens at or after the closing timing of the exhaust valve 32.

To be more specific, the above described minimum fuel injection amount is an amount of the fuel that is injected during a minimum fuel injection time period that can be realized when the driving electric current during the execution of the maximum electric current application mode is supplied to the fuel injection valve 26 in a predetermined high fuel pressure condition during the execution of the maximum electric current application mode, and the amount can be stored in advance in the ECU 34. Further, the target fuel injection amount at the execution of the maximum electric current application mode (fail safe mode) is herein a value positioned as a fuel injection amount for establishing combustion, which corresponds to a fuel injection amount that is capable of adjusting the air fuel ratio to a value (for example, 12) having a predetermined margin with respect to a misfire limit at the rich side under the current intake air amount. The target fuel injection amount in this case can be obtained by adjusting the fuel injection period while using the fuel pressure controlled during the execution of the maximum electric current application mode (the above described predetermined high fuel pressure) as a basis for calculation. It is noted that the above described target fuel injection amount is not limited to the one that is set as described above, and may, for example, be the stoichiometric air fuel ratio (14.5).

FIG. 3(A) shows a fuel injection control in a case in which the closing timing EVC of the exhaust valve 32 is present at the advance side of the intake and exhaust top dead center TDC. The fuel injection in this case is performed with the above described minimum fuel injection amount as shown in FIG. 3(A). In addition, the start timing of the fuel injection is advanced to a timing at the advance side of the closing timing EVC of the exhaust valve 32 so that the amount of the fuel injected during a period from the closing timing EVC of the exhaust valve 32 to a completion timing of the fuel injection coincides with the target fuel injection amount. That is to say, the start timing of the fuel injection is set so that fuel of the amount corresponding to the difference between the target fuel injection amount and the minimum fuel injection amount is injected during a period in which the exhaust valve 32 is opened during the exhaust stroke.

On the other hand, FIG. 3(B) shows a fuel injection control in a case in which the closing timing EVC of the exhaust valve 32 is present at the retard side of the intake and exhaust top dead center TDC. The fuel injection in this case is also performed with the above described minimum fuel injection amount as shown in FIG. 3(B). In addition, the start timing of the fuel injection is advanced to a timing at the advance side of the closing timing EVC of the exhaust valve 32 so that the amount of the fuel injected during a period from the intake and exhaust TDC to a completion timing of the fuel injection coincides with the target fuel injection amount. That is to say, also in the case shown in FIG. 3(B), the start timing of the fuel injection is set so that fuel of the amount corresponding to the difference between the target fuel injection amount and the minimum fuel injection amount is injected during a period in which the exhaust valve 32 is opened during the exhaust stroke.

According to each fuel injection shown in above FIGS. 3(A) and (B), the fuel of the amount obtained by subtracting the target fuel injection amount from the minimum fuel injection amount is injected into the cylinder during the period in which gas is exhausted toward the exhaust passage 18 from the cylinder. By using the fuel injection control of the present embodiment, the start timing of the fuel injection at the exhaust stroke is therefore to be more advanced as the target fuel injection amount is smaller, that is, the difference between the target fuel injection amount and the minimum fuel injection amount is larger, in a situation in which the target fuel injection amount is smaller than the minimum fuel injection amount.

Next, the concrete processes according to the present embodiment of the present invention will be described with reference to FIG. 4.

Figure 4:
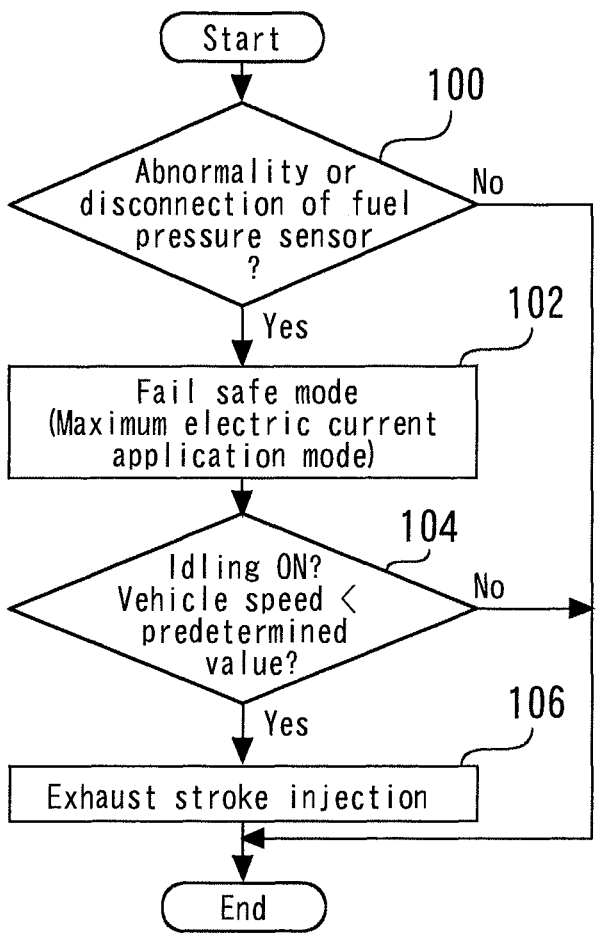
FIG. 4 is a flowchart of a routine that is executed in the first embodiment of the present invention.

FIG. 4 is a flowchart illustrating a control routine that is executed by the ECU 34 to implement the above described fuel injection control. It is noted that the present routine is executed repeatedly at predetermined control intervals.

In the routine shown in FIG. 4, first, it is determined whether or not an abnormality or a disconnection of the fuel pressure sensor 36 has occurred based on whether or not the output value of the fuel pressure sensor 36 is within a predetermined normal range (step 100).

If it is determined in step 100 that the abnormality or disconnection of the fuel pressure sensor 36 has occurred, that is, if there arises a situation in which accurate fuel pressure information is not able to be obtained, the above described maximum electric current application mode is executed as a fail safe mode (step 102). Because of this, the driving current of the fuel injection valve 26 is set to the value at the above described high fuel pressure mode, and the fuel pressure is set to a predetermined value within the high fuel pressure range targeted for the high fuel pressure mode, regardless of the operational region of the internal combustion engine 10.

Next, it is determined whether or not an idling flag is set to ON, or the vehicle speed is lower than a predetermined value (step 104). It is noted that the idling flag is a flag which is set to ON when the internal combustion engine 10 is determined to have come into an idling state based on the output of the throttle angle sensor 24.

If the determination in step 104 described above is established, that is, when the idling operation or low speed running is performed, the exhaust stroke injection (more specifically, the fuel injection control shown in FIG. 3(A) or 3(B)) is executed.

According to the fuel injection control of the present embodiment described so far, the amount of fuel left in the cylinder can be continuously controlled to the target fuel injection amount by causing the surplus amount of fuel which exceeds the target fuel injection amount to be blown to the exhaust passage 18 side when the minimum fuel injection amount exceeds the target fuel injection amount as a result of the execution of the maximum electric current application mode. This makes it possible to improve controllability of the internal combustion engine 10 during an evacuation driving, while ensuring continuation of the operation of the internal combustion engine 10 in the high load region, even when accurate fuel pressure information has become unable to be obtained due to the abnormality or the like of the fuel pressure sensor 36.

Meanwhile, in the first embodiment, which has been described above, the determination is made such that when the idling operation or the low speed running is performed during the execution of the fail safe mode (maximum electric current application mode), a situation in which the target fuel injection amount becomes smaller than the minimum fuel injection amount occurs. However, the target fuel amount level determination means is not limited to the one using the above described method, and may, for example, directly determine the difference between the target fuel injection amount and the minimum fuel injection amount, which are calculated respectively. In addition, during the operation of the internal combustion engine, the fuel pressure itself may becomes abnormal due to the abnormality of a fuel pump or the like, besides the case in which the accurate fuel pressure information has become unable to be obtained as described above. The present invention is effective even in a case in which there occurs the abnormality due to which the fuel pressure becomes higher than that at normal state and thus in which the target fuel injection amount becomes smaller than the minimum fuel injection amount.

Moreover, in the first embodiment, which has been described above, the start timing of the fuel injection is set so that if it is determined that there occurs the situation in which the target fuel injection amount becomes smaller than the minimum fuel injection amount, fuel of the amount corresponding to the difference between the target fuel injection amount and the minimum fuel injection amount is injected during a period in which the exhaust valve 32 is opened during the exhaust stroke. Therefore, the amount of the fuel left in the cylinder can be continuously and accurately controlled to the target fuel injection amount by causing only the surplus amount of fuel to be blown to the exhaust passage 18 side. However, the fuel injection timing setting means in the present invention is not limited to the one in which the start timing of the fuel injection is strictly set based on the difference between the target fuel injection amount and the minimum fuel injection amount, as in the above described method. More specifically, the start timing of the fuel injection may, for example, be advanced easily compared with normal state so as to be performed within the period in which the exhaust valve 32 is opened during the exhaust stroke when it is supposed that the situation in which the target fuel injection amount becomes smaller than the minimum fuel injection amount occurs.

It is noted that in the first embodiment, which has been described above, the ECU 34 executes the processing of above step 104 during the execution of the maximum electric current application mode in above step 102, whereby the "target fuel amount level determination means" according to the above described first aspect of the present invention is realized; and the ECU 34 executes the processing of above step 106 when the determination in above step 104 is positive, whereby the "fuel injection timing setting means" according to the above described first aspect of the present invention is realized.

DESCRIPTION OF SYMBOLS 10 internal combustion engine
14 combustion chamber
16 intake passage
18 exhaust passage
22 throttle valve
24 throttle angle sensor
26 fuel injection valve
28 ignition plug
30 intake valve
32 exhaust valve
34 ECU (Electronic Control Unit)
36 fuel pressure sensor
40 vehicle speed sensor

The invention claimed is:

1. A control apparatus for an internal combustion engine, comprising:
 a fuel injection valve which is capable of directly injecting fuel into a cylinder;
 target fuel amount level determination means which determines whether or not a target fuel injection amount is smaller than a minimum fuel injection amount that the fuel injector can inject at one time during one opening and closing operation of the fuel injection valve; and
 fuel injection timing setting means which if the target fuel injection amount is smaller than the minimum fuel injection amount, sets a start timing of fuel injection within a period in which an exhaust valve is opened during an exhaust stroke.

2. The control apparatus for an internal combustion engine according to claim 1,
 wherein the fuel injection timing setting means sets the start timing of fuel injection in such a way that a fuel corresponding to a difference between the target fuel injection amount and the minimum fuel injection amount is injected during the period in which the exhaust valve is opened during the exhaust stroke.

3. The control apparatus for an internal combustion engine according to claim 1,
 wherein the fuel injection timing setting means advances the start timing of fuel injection more as the difference between the target fuel injection amount and the minimum fuel injection amount is larger.

4. A control apparatus for an internal combustion engine, comprising:
 a fuel injection valve which is capable of directly injecting fuel into a cylinder; and
 a controller that is programmed to:
 determine whether or not a target fuel injection amount is smaller than a minimum fuel injection amount that the fuel injector can inject at one time during one opening and closing operation of the fuel injection valve; and
 set a start timing of fuel injection within a period in which an exhaust valve is opened during an exhaust stroke if the target fuel injection amount is smaller than the minimum fuel injection amount.

* * * * *